United States Patent
MacWilliams et al.

(10) Patent No.: US 9,831,706 B2
(45) Date of Patent: Nov. 28, 2017

(54) TECHNIQUES AND SYSTEMS FOR GENERATING POWER USING MULTI-SPECTRUM ENERGY

(71) Applicants: Graham T. MacWilliams, Los Altos Hills, CA (US); Duncan S. MacWilliams, Los Altos Hills, CA (US)

(72) Inventors: Graham T. MacWilliams, Los Altos Hills, CA (US); Duncan S. MacWilliams, Los Altos Hills, CA (US)

(*) Notice: Subject to any disclaimer, the term of this patent is extended or adjusted under 35 U.S.C. 154(b) by 934 days.

(21) Appl. No.: 13/920,013

(22) Filed: Jun. 17, 2013

(65) Prior Publication Data
US 2014/0368046 A1 Dec. 18, 2014

(51) Int. Cl.
*H02J 4/00* (2006.01)
*H02J 7/02* (2016.01)
(Continued)

(52) U.S. Cl.
CPC ............ *H02J 7/025* (2013.01); *H02J 7/32* (2013.01); *H02J 7/35* (2013.01); *H02J 17/00* (2013.01);
(Continued)

(58) Field of Classification Search
CPC .. H04B 7/0426; H04W 52/325; H04W 52/42; H04L 5/0023; H04L 5/0048; H02J 1/10;
(Continued)

(56) References Cited

U.S. PATENT DOCUMENTS

| 6,906,495 B2 | 6/2005 | Cheng et al. |
| 7,271,569 B2 | 9/2007 | Oglesbee |

(Continued)

FOREIGN PATENT DOCUMENTS

FR 2879852 6/2006

OTHER PUBLICATIONS

U.S. Appl. No. 14/606,028, filed Jan. 27, 2015 and listing Graham T. MacWilliams and Duncan S. Williams as inventors.
(Continued)

*Primary Examiner* — Thienvu Tran
*Assistant Examiner* — Brian K Baxter
(74) *Attorney, Agent, or Firm* — Kenneth C. Brooks (57) ABSTRACT

The present invention is directed to techniques and apparatus for generating power using multi-spectrum energy. An apparatus includes an electrical device and a power source, the power source comprising a multi-spectrum power generation system in electrical communication with the mobile electrical device, the multi-spectrum power generation system including a photovoltaic electrical power generator, and a microelectromechanical power generator; a primary power storage system in electrical communication with the electrical device; and a controller system in data communication with the multi-spectrum energy power generator systems to regulate electrical communication between the power storage system and the power generation system. In an alternative embodiment, the multi-spectrum power generation system may further a thermoelectric power generator.

17 Claims, 7 Drawing Sheets

(51) Int. Cl.
*H02J 7/32* (2006.01)
*H02J 7/35* (2006.01)
*H02J 17/00* (2006.01)

(52) U.S. Cl.
CPC ......... *Y02E 10/566* (2013.01); *Y10T 307/696* (2015.04)

(58) Field of Classification Search
CPC .. H02J 9/061; H02J 3/382; G06F 1/26; G06F 1/263
USPC .......................................................... 307/80
See application file for complete search history.

(56) References Cited

U.S. PATENT DOCUMENTS

| | | | |
|---|---|---|---|
| 7,557,293 B2 * | 7/2009 | Chou ................ | H01L 31/02167 136/244 |
| 8,271,053 B2 | 9/2012 | Choi et al. | |
| 8,427,098 B2 | 4/2013 | Moore et al. | |
| 8,519,595 B2 * | 8/2013 | Hunter .................... | H01L 37/02 310/305 |
| 8,781,538 B2 | 7/2014 | Morichi | |
| 9,130,651 B2 * | 9/2015 | Tabe .................... | H04B 1/3838 |
| 2003/0140960 A1 | 7/2003 | Baum et al. | |
| 2007/0107766 A1 * | 5/2007 | Langley, II ............. | H02J 17/00 136/243 |
| 2008/0001735 A1 * | 1/2008 | Tran .................... | G06F 19/3418 340/539.22 |
| 2008/0138680 A1 | 6/2008 | Hu et al. | |
| 2012/0068537 A1 * | 3/2012 | Hintz .................... | B60L 11/005 307/43 |
| 2013/0109443 A1 | 5/2013 | Eaton et al. | |
| 2013/0305528 A1 * | 11/2013 | Anderson ............. | H02J 7/0052 29/825 |
| 2014/0097786 A1 * | 4/2014 | Grimes .................. | H02S 10/30 320/101 |
| 2014/0167676 A1 * | 6/2014 | Mack .................... | H02J 7/0004 320/101 |
| 2014/0261636 A1 * | 9/2014 | Anderson ............. | H02J 7/0042 136/251 |
| 2014/0263989 A1 * | 9/2014 | Valentino .................. | G01T 1/02 250/239 |
| 2014/0264047 A1 * | 9/2014 | Valentino .................. | G01T 1/02 250/370.01 |
| 2014/0268601 A1 * | 9/2014 | Valentino ................ | G01T 1/026 361/752 |
| 2014/0299783 A1 * | 10/2014 | Valentino .............. | G01J 1/0488 250/394 |
| 2014/0308930 A1 * | 10/2014 | Tran ...................... | H04W 4/001 455/414.1 |
| 2014/0366927 A1 * | 12/2014 | Lavrova .................. | H02J 17/00 136/244 |
| 2014/0368046 A1 | 12/2014 | MacWilliams et al. | |
| 2015/0102762 A1 | 4/2015 | Goei et al. | |
| 2015/0130397 A1 | 5/2015 | Sells | |
| 2015/0162781 A1 | 6/2015 | Fratti et al. | |
| 2015/0256026 A1 | 9/2015 | Rybkiewicz | |
| 2015/0270736 A1 * | 9/2015 | MacWilliams ......... | H02J 7/025 320/101 |
| 2015/0270742 A1 * | 9/2015 | MacWilliams ........... | H02J 7/35 320/101 |
| 2015/0280488 A1 | 10/2015 | Wyrwas et al. | |
| 2015/0338525 A1 * | 11/2015 | Valentino .............. | G01J 1/0219 250/395 |
| 2016/0140834 A1 * | 5/2016 | Tran ..................... | G08B 25/016 340/539.11 |

OTHER PUBLICATIONS

Wikipedia, Internet Publication, Photovoltaic System, May 27, 2013.
United States Patent Office, Ex Parte Quayle Action mailed Nov. 27, 2015 for U.S. Appl. No. 14/221,196.
United States Patent Office, Notice of Allowance mailed Jul. 21, 2016 for U.S. Appl. No. 14/221,196.
18th IEEE International Conference on Micro Electro Mechanical Systems, 2005. MEMS 2005, Generating Electric Power With a MEMS Electroquasistatic Induction Turbine-Generator, Steyn et al.
MicroGen Systems, Inc., Product Brochure for Vibrational Energy Harvesting Micro Power Generator, published 2012.
United States Patent Office, Office Action mailed Oct. 10, 2016 for U.S. Appl. No. 14/606,028.
United States Patent Office, Office Action mailed Oct. 10, 2016 for U.S. Appl. No. 14/221,222.

* cited by examiner

TECHNIQUES AND SYSTEMS FOR GENERATING POWER USING MULTI-SPECTRUM ENERGY

The present invention relates to electricity production and more particularly to the generating electricity for devices not continuously coupled to an electrical grid when using electricity.

Historically, electricity is generated at a central location, commonly referred to as a power station, and transmitted over a network of transmission lines to substations located proximate to demand centers. This is referred to as an electrical grid. The substations typically step-down the voltage and transmit the stepped-down electricity to end users of the demand centers. With the advent of computing technology mobile devices using electricity have increased the demand for devices that use energy and are not continuously coupled to the electrical grid. Examples of such devices include cameras, sensors, telephones, radios, tablet computers lighting systems, automobiles and drones just to name a few.

Mobile electrical devices, such as cellular telephones, computing tablets and laptops have become the preferred device for the personal computing experience and have driven recent changes in power generating technology. This is, in part, attributable to the ease of transport that provides substantially continued access, as well as the expansion of wireless access to networked computing environments, such as the internet. Additionally, the computational power of these devices has attained a level almost equal to that of the traditional desktop computing environment. However, with the increased computational power of the mobile electrical devices the energy usage of the same also increases. This provides the deleterious effect of necessitating an increase in the size of the power storage device, e.g., battery. This reduces one of attractive features of these devices, ease of transport. As the power storage device increases so does the size and weight of the mobile electrical device. The typical solution to overcome the conflicting requirements increasing the computation power of a mobile electrical device without increasing the weight and/or size of the same is to increase the efficiency of the computing device and/or the efficiency of the energy storage system.

U.S. Pat. No. 8,084,995 discloses an intelligent lithium-battery-activating charging device connectable between a charging power source and an application electrical device and contains an internal circuit that builds up a charging/discharging mode to correspond the charging power source to a lithium battery accommodated in the application electrical device. After a short time period of charging, which is short enough that the voltage detection circuit inside the application electrical device cannot properly respond, a time period of discharging follows and then discharging is stopped, so that the detection performed by the voltage detection circuit is delayed until the cycles of short time period charging and discharging are completed. If the detection shows the battery is not fully charged, then the charging operation starts again. During the charging process, ions are moved in one direction in one moment and then reversed in the next moment so that built up of deposition on electrodes can be avoided.

United States patent publication number 20130122973 to Mark Caskey discloses apparatuses, systems and methods for reducing power consumption during standby operation of a mobile device. A page decoding algorithm can be stored in nonvolatile memory during standby. The page decoding algorithm can be executed from the nonvolatile memory, when the mobile device is awakened from a sleep state to determine if there is any activity such as an incoming call. No power is required for the nonvolatile memory to maintain storage of the algorithm so that the power requirement during standby of the mobile device is reduced.

United States patent publication number 20130109443 to Eric Eaton discloses a power management method with a portable electronic device that includes identifying, with a controller of the portable electronic device, a power consumption event in the portable electronic device, the power consumption event having a power consumption requirement. The method further includes selecting, in response to the identifying, one of a collection of energy storage devices in an energy storage device farm for the portable electronic device, the selecting being based at least on the power consumption requirement of the power consumption event and on one or more characteristics of the one of the plurality of energy storage devices. The portable electronic device executes the power consumption event using energy stored in the selected one of the plurality of energy storage devices. The portable electronic device may be a mobile phone or other wireless communication device.

Thus it is realized that a need exists to provide improved energy supplies for devices powered by electricity.

BRIEF SUMMARY OF THE INVENTION

The present invention is directed to techniques and apparatus for generating power using multi-spectrum energy. An apparatus includes an electrical device and a power source, the power source comprising a multi-spectrum power generation system in electrical communication with the mobile electrical device, the multi-spectrum power generation system including a photovoltaic electrical power generator, and a microelectromechanical power generator; a primary power storage system in electrical communication with the electrical device; and a controller system in data communication with the multi-spectrum energy power generator systems to regulate electrical communication between the power storage system and the power generation system. In an alternative embodiment, the multi-spectrum power generation system may further a thermoelectric power generator. Other embodiments of the current invention are described more fully below.

DETAILED DESCRIPTION OF THE INVENTION

Figure 1:
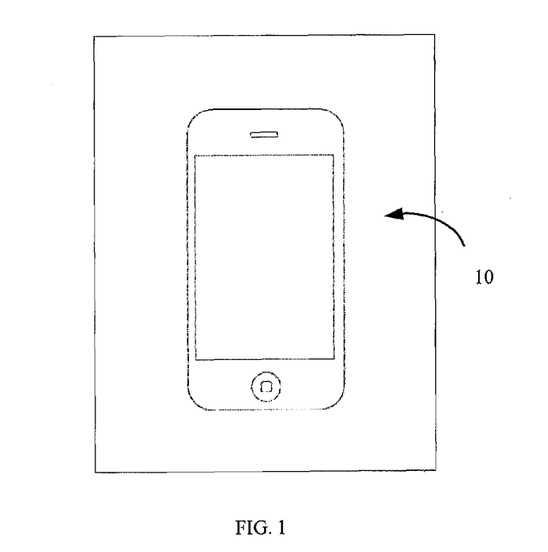
FIG. 1 is a simplified top view of an example of a mobile electrical device that may employ the present invention.

Referring to FIG. 1 an example of a mobile electrical device 10 that may employ the current invention is shown, which is commonly referred to as a smart phone. One such mobile electrical device is sold by Apple Computer of Cupertino, Calif. under the name an iPhone®, or the mobile electrical device available from the Open Handset Alliance of South Korea under the name Android®.

Figure 2:
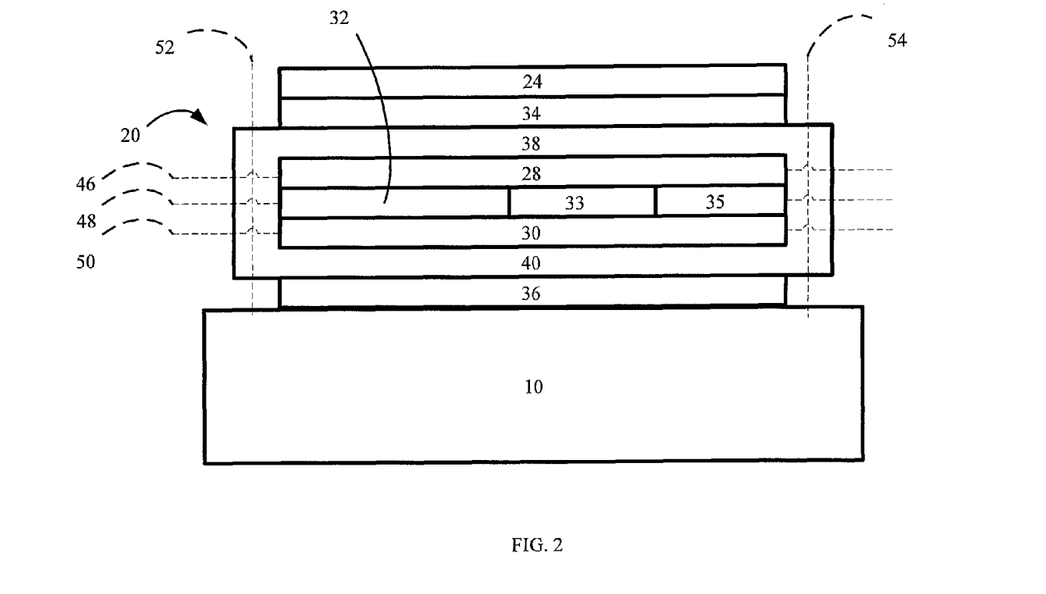
FIG. 2 is a side view of power generation system that may be used to power the mobile electrical device shown in FIG. 1 in accordance with the present invention.

Referring to both FIGS. 1 and 2, in electrical communication with mobile electrical device 10 is a power source 20. Power source 20 includes a multi-spectrum power generation system in electrical communication with mobile electrical device 10. The multi-spectrum power generation system includes a photovoltaic electrical power generator 24, a thermoelectric power generator and a microelectromechanical power generator 28. Power source 20 also includes a primary power storage system 30 in electrical communication with mobile electrical device 10 and a controller system 32. Controller system 32 is in data communication with the multi-spectrum power generation system to regulate electrical communication between primary power storage system 30 and the multi-spectrum power generation system. To that end, controller system 32 includes a computer processor 33 and a memory 35 that stores computer readable instructions that are operated on by processor 33 to regulate power source 20 and a plurality of switches, discussed more fully below with respect to FIG. 3. Referring again to both FIGS. 1 and 2, power source 20 also includes a thermal dissipation system coupled between thermoelectric power generator and controller system 32 to remove thermal energy away from power source 20.

Primary power storage system 30 may be any suitable electrical storage device. Examples of primary power storage system 30 include lithium batteries, nickel cadmium batteries, nickel metal hydride, nickel polymer batteries, lithium sulfur battery, potassium-ion battery and the like. It is also contemplated that certain thin film batteries from this emerging field may also be employed as primary power storage system 30. It should be understood that primary power storage system 30 may comprise of a battery native to mobile electrical device 10, i.e., one that is included with the same. Alternatively, power source may be completely integrated to include primary power storage system 30. In this manner power source 20 may be an after marker device to be used with an existing mobile electrical device 10. Alternatively, power source 20 may be used as a replacement for a native battery in a mobile computing device 10. It is desired, however, that primary power storage system 30 be capable of being recharged after power has been drained therefrom. To that end, power source 20 includes a multi-spectrum power generation system with which to produce electricity to recharge primary power storage system 30.

The benefits afforded by multi-spectrum power generation system are manifold. It provides extended power for mobile electrical device 10 in the absence of having to couple the same to the electrical grid, i.e., an alternating current wall outlet for charging primary power storage system 30. Additionally, it allows multiple transducers to create electricity from a variety of physical phenomena. In the present example, electricity is produced by photons, heat and mechanical movement. The likelihood of any one or more of these physical phenomena occurring to produce electricity is greater than relying upon single physical phenomena. This reduces the quantity of power that need be stored by primary power storage system 30, because the time between recharge may be greatly reduced.

Generation of electricity from photovoltaic technology is well known. Thus, photovoltaic electrical power generator 24 may employ any suitable photovoltaic technology. As shown, photovoltaic electrical power generator 24 may comprise of a solar panel arranged such that when optical energy from an optical source, e.g., the sun, or other light source, impinges upon photovoltaic electrical power generator 24 and electricity is generated. To that end, photovoltaic electrical power generator 24 is typically positioned so as to be located on a side of power source 20 opposite to mobile electrical device 10. In this manner, photovoltaic electrical power generator 24 may be exposed to an optical source.

Adjacent to photovoltaic electrical power generator 24 is a first segment 34 of thermoelectric power generator. Thermoelectric power generator produces electricity in response to being exposed to thermal energy. Any suitable thermoelectric power generator may be employed. Examples of thermoelectric power generators that may be employed are available from TEG Power, 364 Patteson Drive #316 Morgantown, W. Va. 26505. To maximize the amount of electrical power generated from thermal energy a second segment 36 of thermoelectric power generator is disposed on a side of power source 20 opposite to photovoltaic electrical power generator 24 and adjacent to mobile electrical device 10. Both segments 34 and 36 are electrically connected to operate as a single unit and positioned to maximize thermal energy sensed by thermoelectric power generator.

Disposed between segments 34 and 36 are primary power storage system 30 controller system 32 and microelectromechanical power generator 28. Microelectromechanical power generator 28 generates electrical power from movement of power source 20. For example, the movement associated with carrying of mobile electrical device 10 coupled to power source 20 would allow microelectromechanical power generator 28 to generate electricity. One example of a microelectromechanical power generator 28 is sold by MicroGen Systems, Inc. 95 Brown Road, Suite 120, Ithaca, N.Y. 14850-1257 under the mark BOLT-R. Primary power storage system 30 is positioned adjacent to microelectromechanical power generator 28 and spaced-apart therefrom, with controller system 32 positioned therebetween.

A thermal dissipation system is included to provide a larger thermal gradient for the thermoelectric elements 34 and 36 to enable more energy creation. Thermal dissipation system includes first 38 and second 40 spaced-apart layers of thermally conductive material. First layer 38 is disposed between segment 34 and microelectromechanical power generator 28. Second layer is disposed between segment 36 and primary power storage system 30. To facilitate discharge of thermal energy into the environs surrounding mobile electrical device 10 a pair of heat sinks 42 and 44 are in thermal communication with first and second layers 38 and 40. Each of microelectromechanical power generator 28, controller system 32 and primary power storage system 30 lie in a separate plane, 46, 48 and 50, respectively. Heat sink 42 extends along a plane 52 that is parallel to a plane 54 over which heat sink 44 extends. Planes 52 and 54 extend transversely to planes 46, 48 and 50. Heat sinks 42 and 44, as well as first 38 and second 40 layers may be formed from any suitable thermally conductive material, such as aluminum, copper, gold, thermally conductive polymers and the like. It should be understood that first and second layers 38 and 40 may be integrally formed with heat sinks 42 and 44 or may be separate components in contact to facilitate thermal conduction.

Referring to both FIGS. 1 and 2, processor 33 is in data communication with several switches 61-66 to regulate electrical communication between primary power storage system 30 and the multi-spectrum power generation system. Specifically, processor 33 is in electrical communication with switches 61-66 over transmission line 68. Power lines place switches 61-66 in electrical communication with primary power source 30 and mobile electrical device 10. As shown, switches 61-66 are connected in common with power line 69. Switch 61 is coupled to regulate electricity propagating between photovoltaic electrical power generator 24 and signal line 68. To that end, switch 61 is in electrical communication with photovoltaic electrical power generator 24 over power line 70. Switch 62 is coupled to regulate electricity propagating between first segment 34 of thermoelectric power generator and signal line 68. To that end switch 62 is in electrical communication with thermoelectric power generator over power line 72. Switch 63 is coupled to regulate electricity propagating between microelectromechanical power generator 28 and signal line 68. To that end, switch 63 is in electrical communication with microelectromechanical power generator 28 over power line 74 via an AC to DC converter 76. Switch 64 is coupled to regulate electricity propagating between second segment 36 of thermoelectric power generator and signal line 68. To that end, switch 64 is in electrical communication with thermoelectric power generator over power line 78. Switch 65 is coupled to regulate electricity propagating between primary storage 30 and signal line 68. To that end, switch 65 is in electrical communication to with primary storage system 30 over power line 80. Switch 66 is coupled to selectively place mobile computing unit 10 in electrical communication with power line 69. To regulate electricity switches 61-65 may be either a binary or analog switch. A binary switch has either an on or off state, i.e., either electricity is allowed to propagate therethrough or electricity is prevented from propagating therethrough. An analog switch, in addition to the off state, allows different magnitudes of current to propagate therethrough.

Figure 3:
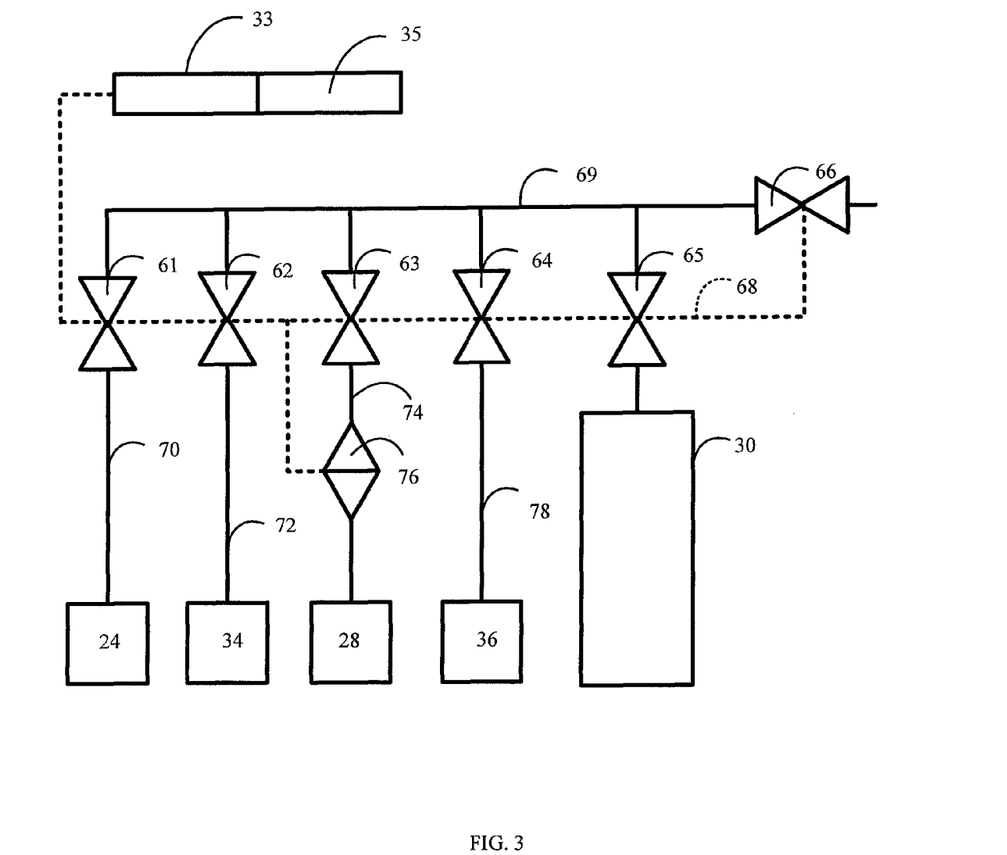
FIG. 3 is a schematic diagram depicting the power generation system shown in FIG. 2.

Referring to both FIGS. 2 and 3, in operation switches 65 and 66 are activated to regulate electricity flowing from primary storage system 30 to mobile electrical device 10, while controller system 32 senses a level of charge in primary power storage system 30 at function 100. At function 102 controller system 32 determines whether primary storage system 30 has less than a predetermined level of charge. Were controller system 32 to sense that the charge level of primary storage system 30 was not below the predetermined level function 100 is repeated. Were controller system 32 to sense that the charge level of primary storage system 30 was below the predetermined level, controller system 32 would cause one or more of switches 61-64 to vary electricity, produced by one or more of photovoltaic electrical power generator 24, a thermoelectric power generator and a microelectromechanical power generator 28, propagating to primary storage system along signal line 68. To that end, charging of primary storage system 30 would occur at function 104. This may be achieved by processor 32 operating one or more of switches 61-65 to allow electricity to propagate to primary power storage 30 at a rate sufficient to charge the same. Charging of primary power storage system 30 would continue until controller system 32 sensed a desired charge level is sensed in primary power storage system 30, e.g., a maximum charge level being present in primary power storage system 30.

The predetermined level of charge may be design dependent. For example, the predetermined level of charge may be 10% of the maximum charge capacity of primary power storage system 30. It should be understood, however, that several factors may be taken into consideration when determining the predetermined level of charge. For example, controller system 32 could sense the drain on primary power storage system 30 and determine that 25%, 20% 15% and the like may be the maximum charge capacity of primary power storage system 30, depending upon the quantity of power being used by mobile electrical device 10.

Figure 4:
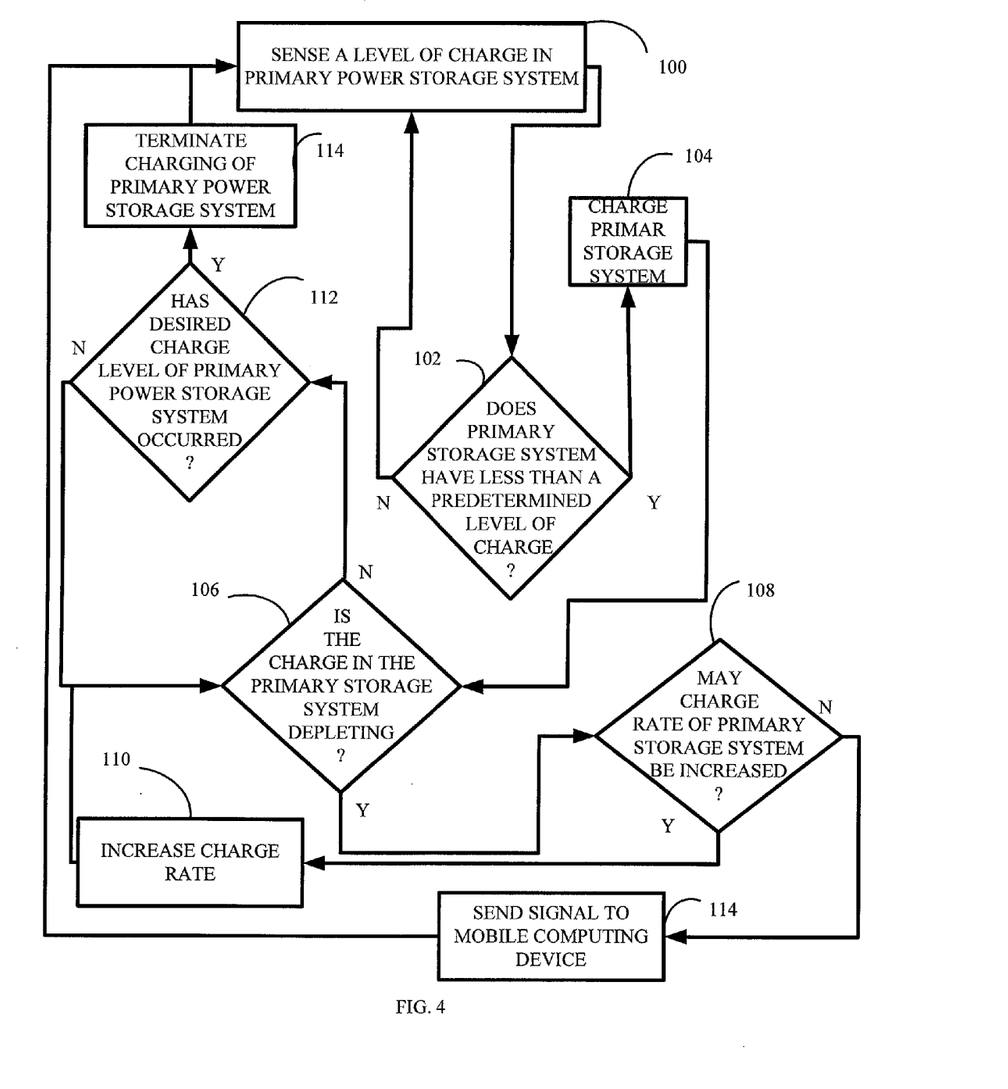
FIG. 4 is a flow diagram demonstrating the operation of the power generation system shown in FIGS. 2 and 3.

Switches 61-64 operated by processor 33 at function 104 may be dependent upon many factors. In a first embodiment, switches 61-64 operated at function 104 is based upon a real time analysis of the electricity being generated by photovoltaic electrical power generator 24, first segment 34 and second segment 36 of thermoelectric power generator and microelectromechanical power generator 28. In this manner, processor 33 senses the electricity at switches 61-64 and determines which combination of switches 61-64 would be operated to supply sufficient electricity to power line 69 to reduce, if not prevent, depletion of the remaining charge in primary power storage system 30. It is desired to achieve simultaneously increasing the charge in primary power storage system 30 while allowing mobile electrical device 10 to operate. Following operation of one or more switches 61-64, controller system 32 determines whether the charge of primary power storage system 30 is decreasing at function 106. If that is the case, then processor 33 determines at function 108 whether the charge rate of primary storage system 30 may be increase. This may be achieved in many achieved either by activating additional switches 61-64 or in the case of analog switches, increase the rate at which electricity propagates therethrough onto signal line 68. If so, at function 110 the charge rate is increased. Following function 110, function 106 is repeated. If controller system 32 determines at function 106 that the charge in primary power storage system 30 was not depleting, then function 112 occurs. At function 112 controller system 32 determines whether a desired charge level of primary power storage system 30 has occurred, e.g., a maximum charge level. If not, function 106 repeats. If the desired charge level has occurred, which may be less than maximum charge, function controller system 32 terminates charging of primary storage system 30 at function 114. This is achieved by controller system 32 operates switches 61-65 to electrically isolate primary power storage 30 from photovoltaic electrical power generator 24, microelectromechanical power generator 28, and first and second segments 34 and 36 of thermoelectric power generator, If processor 33 determines at function 108 that the charge rate of primary storage system 30 may not be increased, function 116 occurs. At function 116 controller system 32 sends a signal to mobile electrical device 10 to indicate that the primary power storage system 30 is being depleted of electrical charge.

Referring to FIGS. 3 and 4, in accordance with another embodiment power source 220 includes a secondary power storage system 290 in addition to a primary power storage system 230. To that end, excepting the addition of secondary power storage system 290 and switch 282, power source 220 is substantially identical to power source 20. Specifically, processor 233 is in data communication with a several switches 261-266 to regulate electrical communication between primary power storage system 230 and the multi-spectrum power generation system. Processor 233 is in electrical communication with switches 261-266 over transmission line 269. Power lines place switches in electrical communication with primary power source 230 and mobile electrical device 10. As shown, switches 261-266 are connected in common with power line 269. Switch 261 is coupled to selectively place photovoltaic electrical power generator 224 in electrical communication to signal line 268 over power line 270. Switch 262 is coupled to selectively place first segment 234 in electrical communication to signal line 268 over power line 272. Switch 263 is coupled to selectively place microelectromechanical power generator 228 in electrical communication to signal line 268 over power line 274 via an AC to DC converter 276. Switch 264 is coupled to selectively place second segment 236 in electrical communication to signal line 268 over power line 278. Switch 265 is coupled to selectively place primary storage 230 in electrical communication to signal line 268 over power line 280. Switch 266 is coupled to selectively place mobile computing unit 10 in electrical communication with power line 268. In this embodiment the presence of switches 283 and 282 facilitate electrically isolating primary power source 280 from photovoltaic electrical power generator 224 first segment 234 and second segment 236 and microelectromechanical power generator 228. In this manner, charging of secondary power storage system 290 may occur without any of the electricity developed by photovoltaic electrical power generator 224 first segment 234 and second segment 236 or microelectromechanical power generator 228 being drawn by mobile electrical device 10. Rather, all the electricity generated thereby could be used to charge secondary primary storage system 290. This reduces the time required for secondary power storage system 290 to reach maximum compared to the time required were mobile electrical device 10 concurrently draining electricity therefrom during charging.

Figure 5:
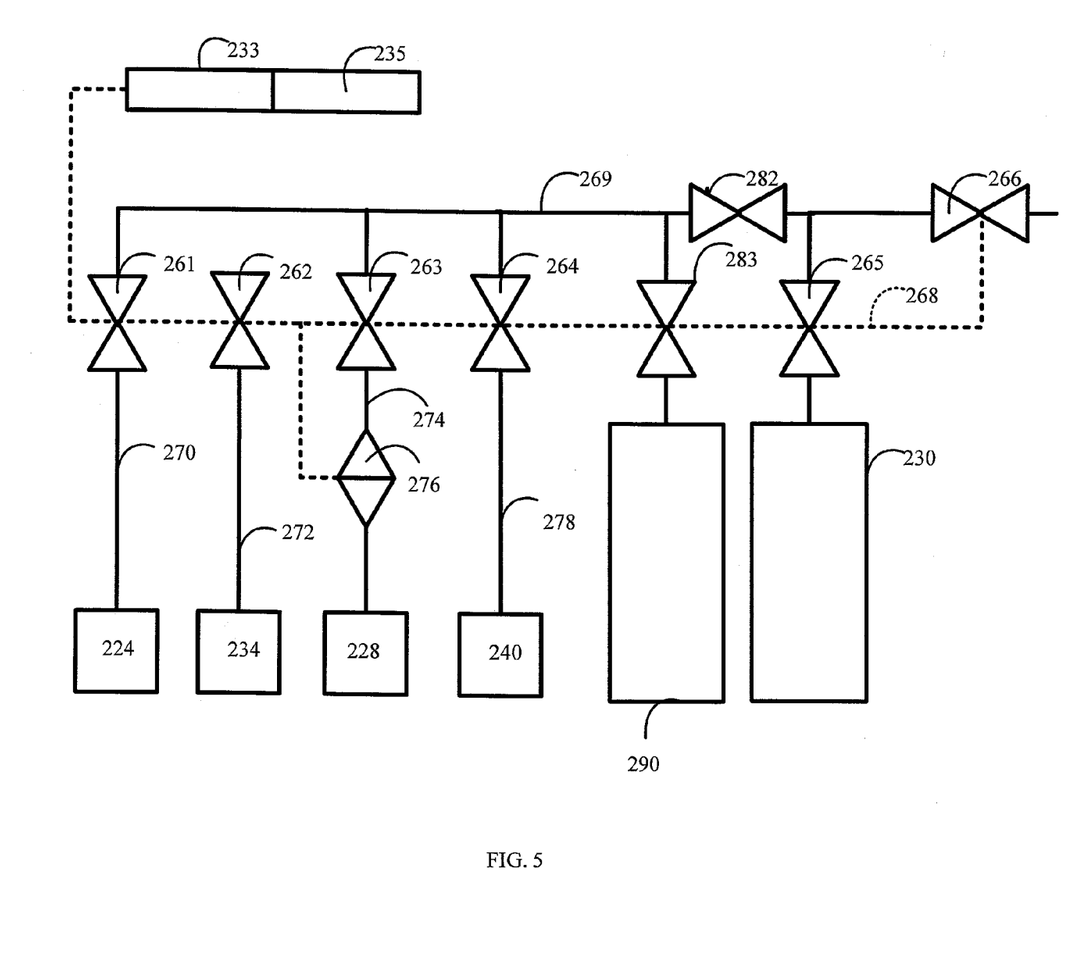
FIG. 5 is a schematic diagram showing a second embodiment of the invention shown in FIGS. 2 and 3.
Figure 6:
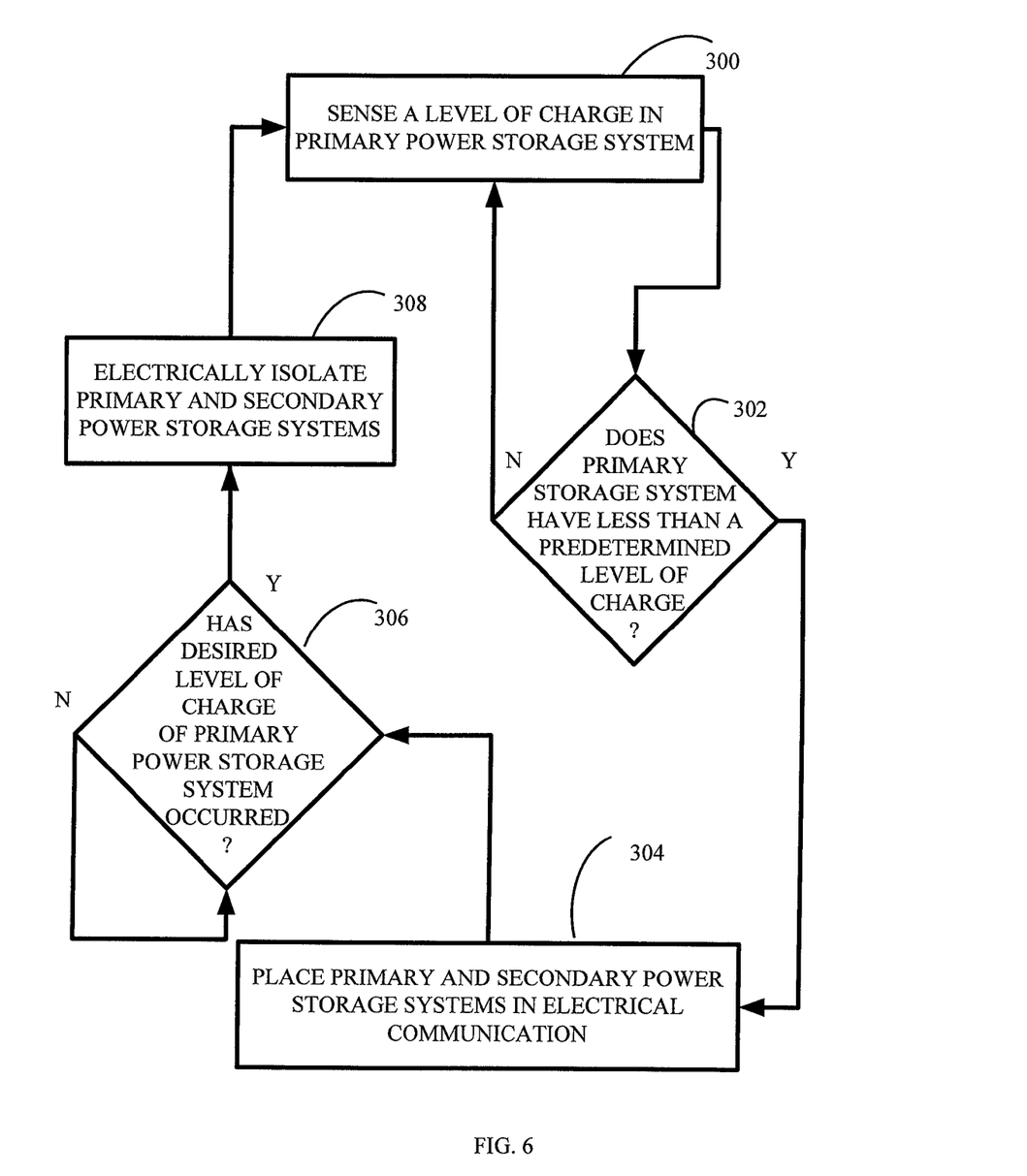
FIG. 6 is a flow diagram demonstrating the operation of charging a primary power storage system of the power generation system shown in FIG. 5.

Referring to both FIGS. 5 and 6, in operation, processor 233 senses a level of charge in primary power storage system 230 at function 300 with switches 265 and 266 being activated to allow electricity to flow from primary storage system 232 to mobile electrical device 10 and switch 282 being activated to electrically isolate primary power storage system 230 from the remaining elements of power source 220. At function 302 processor 233 determines whether primary storage system 230 has less than a predetermined level of charge. Were processor 233 to sense that the charge level of primary storage system 230 was not below the predetermined level function 300 is repeated. Were processor 233 to sense that the charge level of primary storage system 230 was below the predetermined level, one or more of switch 282 would be activated to allow electricity to propagate between primary power storage 230 and secondary power storage system 290 at function 304. To that end, switch 282 is activated to place primary 230 and secondary 290 power storage systems in electrical communication. Charging of primary power storage system 230 would continue until processor 233 sensed a maximum charge level being present in primary power storage system 230 at function 306. Once processor 233 determines that the maximum level of charge has been reached in primary power storage system 230, processor 233 activates switch 282 to electrically isolate primary power storage system 230 from second power storage system 290.

Figure 7:
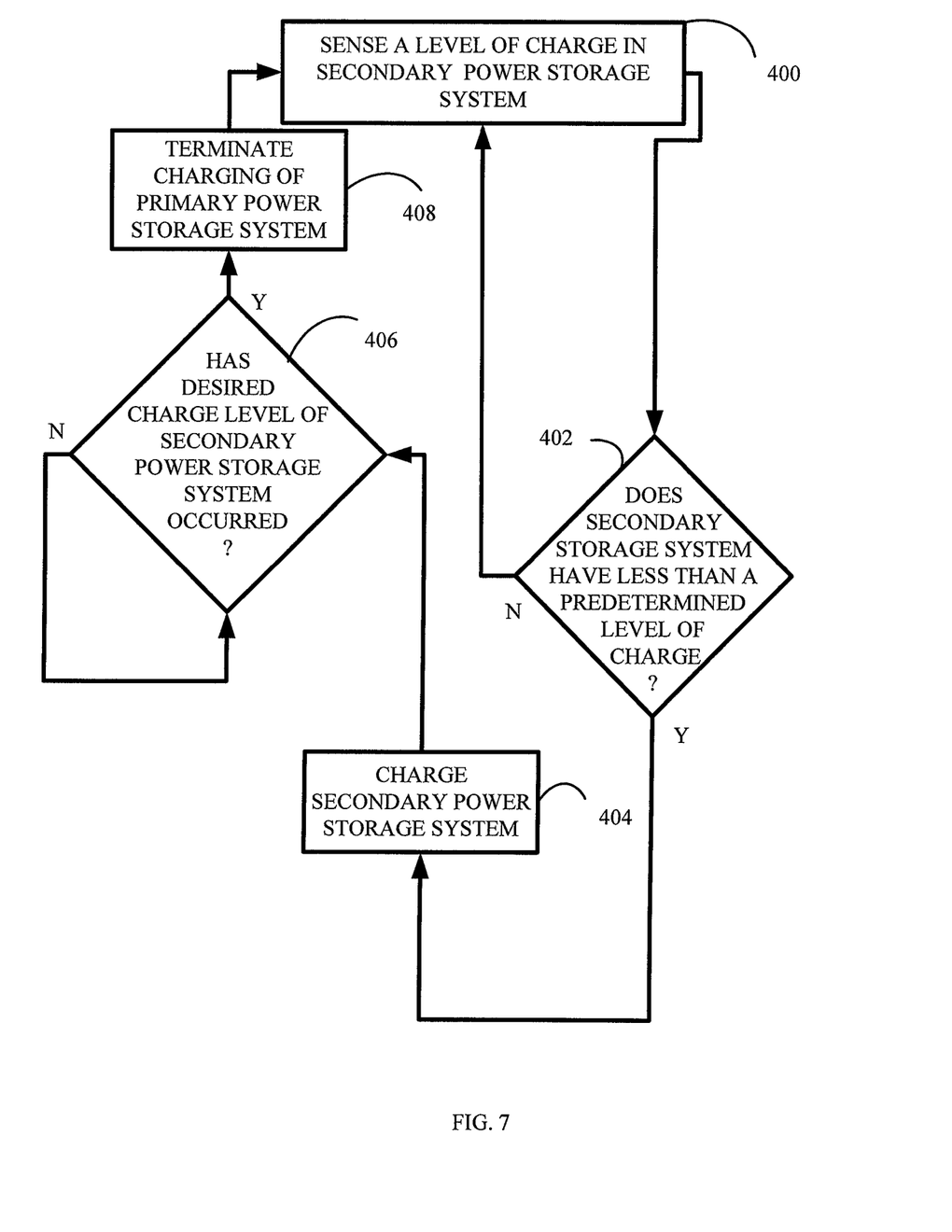
FIG. 7 is a flow diagram demonstrating the operation of charging a secondary power storage system of the power generation system shown in FIG. 5.

Referring to both FIGS. 6 and 7, once processor 233 isolates primary 230 and secondary 290 power storage systems, processor 233 concurrently senses the level of charge in primary power storage system 230 and secondary power storage system 290. In this configuration processor 233 senses a level of charge in secondary power storage system 290 at function 400. At function 402, processor 233 determines whether secondary storage system 290 has less than a predetermined level of charge. Were processor 233 to sense that the charge level of secondary storage system 290 was not below the predetermined level function 400 is repeated. Were processor 233 to sense that the level of charge of secondary storage system 290 was below the predetermined level, at function 404 one or more of switches 61-64 would be operated to allow electricity charge primary power storage 30. In this fashion, secondary power storage system 290 may be charged. Charging of primary power storage system would continue until processor 233 sensed a desired charge level present in primary power storage system 290, e.g., a maximum charge level. To that end, following function 404, function 406 occurs at which point processor 233 determines whether secondary power storage system 290 has reached the desired level of charge. If so, function 408 occurs at which point charging of secondary storage system 290 terminates. This occurs by processor 233 operating on switches 261-264 to prevent electricity generated by photovoltaic electrical power generator 224, microelectromechanical power generator 228, and first and second segments 234 and 236 of thermoelectric power generator from propagating along signal line 269. If not, function 406 repeats. Following function 408, function 400 repeats.

Figure 8:
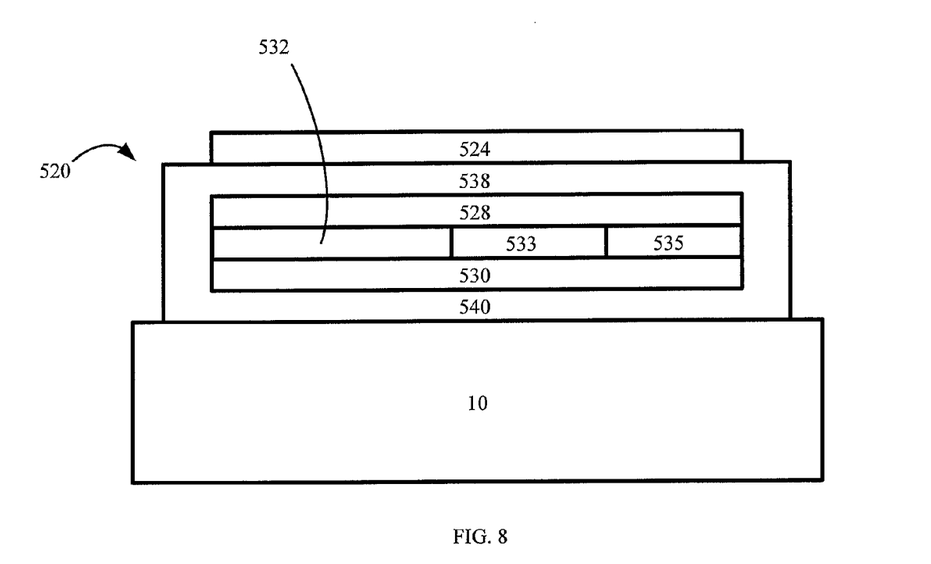
FIG. 8 is a side view of power generation system shown in FIG. 1 in accordance with an alternate embodiment of the present invention.

Referring to both FIGS. 1 and 8, in an alternate embodiment power source 20 need not include thermoelectric generator. This is shown by power source 520 being virtually identical to power source 20, excepting the omission of first and second segments 34 and 36 of thermoelectric power generator. To that end power source 520 includes photovoltaic electrical power generator 524, microelectromechanical power generator 528 controller system 532 computer processor 533, memory 535 first 538 and second 540 spaced-apart layers of thermally conductive material. Photovoltaic electrical power generator 24, microelectromechanical power generator 28 controller system 32 computer processor 33, memory 35 first 38 and second 40 spaced-apart layers of thermally conductive material are identical to photovoltaic electrical power generator 524, microelectromechanical power generator 528 controller system 532 computer processor 533, memory 535 first 538 and second 540 spaced-apart layers of thermally conductive material, respectively.

Figure 9:
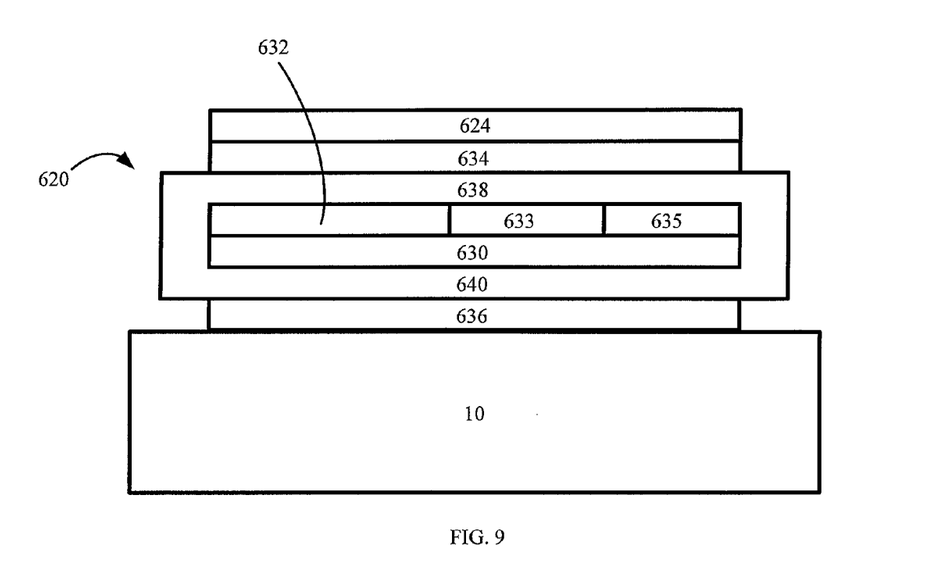
FIG. 9 is a side view of power generation system shown in FIG. 1 in accordance with a second alternate embodiment of the present invention.

Referring to both FIGS. 1 and 9, in a second alternate embodiment power source 20 need not include microelectromechanical power generator 28. This is shown by power source 620 being virtually identical to power source 20, excepting the omission of microelectromechanical power generator 28. To that end power source 620 includes photovoltaic electrical power generator 624, first and second segments 634 and 636 of thermoelectric power generator, controller system 632 computer processor 633, memory 635 first 638 and second 640 spaced-apart layers of thermally conductive material. Photovoltaic electrical power generator 24, first and second segments 34 and 36 of thermoelectric power generator, controller system 32 computer processor 33, memory 35 first 38 and second 40 spaced-apart layers of thermally conductive material are identical to photovoltaic electrical power generator 624, first and second segments 634 and 636 of thermoelectric power generator, controller system 632 computer processor 633, memory 635 first 638 and second 640 spaced-apart layers of thermally conductive material, respectively. Although first and second segments 634 and 636 of thermoelectric power generator are shown, it should be understood that both are not required. Either first or second segments 634 and 636 of thermoelectric power generator may be omitted, thereby employing only a single segment 534 or 636 of the thermoelectric power generator.

It should be understood that the foregoing description is merely an example of the invention and that modifications may be made thereto without departing from the spirit and scope of the invention and should not be construed as limiting the scope of the invention. For example, the foregoing discussion is with respect to mobile electrical devices; however, the present invention may be employed with electrical devices that are not mobile, i.e., continuously and/or intermittently connected to an electrical grid. Furthermore, discussing the implementation of the present invention in a smartphone is not meant to limit the application of the current invention to smartphone mobile electrical devices. The present invention may be implemented in virtually any mobile electrical device, such as cameras, sensors, telephones, radios, tablet computers, lighting systems, automobiles and drones just to name a few. The scope of the invention should be determined with respect to the appended claims, including the full scope of equivalents thereof.

The invention claimed is:

1. An apparatus including a portable electrical device and a power source, said power source comprising:
    a multi-spectrum power generation system in electrical communication with the portable electrical device, said multi-spectrum power generation system including a photovoltaic electrical power generator, a thermoelectric power generator, and a microelectromechanical power generator;
    a primary power storage system in electrical communication with the portable electrical device; and
    a controller system in data communication with the multi-spectrum energy power generation system to regulate electrical communication between said power storage system and said multi-spectrum energy power generation system, with said primary energy storage system being positioned adjacent to said controller system and said thermoelectric power generator including first and second layers, said microelectromechanical power generator and said controller system being positioned between said first and second layers.

2. The apparatus as recited in claim 1 further including a thermoelectric power generator and a thermal dissipater coupled between said thermoelectric power generator and said microelectromechanical power generator.

3. The apparatus as recited in claim 1 wherein said primary power storage system is positioned adjacent to and spaced-apart from said microelectromechanical power generator, with said controller system being disposed therebetween and said thermoelectric power generator including first and second segments, said microelectromechanical power generator, said controller system and said primary energy storage system being disposed between said first and second segments.

4. The apparatus as recited in claim 1 further including a thermal dissipation system to allow thermal energy to propagate away from said portable electrical device and a thermoelectric power generator, wherein said primary energy storage system being positioned adjacent to and spaced-apart from said microelectromechanical power generator, with said controller system being disposed therebetween and said thermoelectric power generator including first and second segments, said microelectromechanical power generator, said controller system and said primary power storage system being disposed between said first and second segments, a first layer of said thermal dissipation system extending between said microelectromechanical power generator and said first segment, and a second layer of said thermal dissipation system extending between said primary power storage system and said second segment.

5. The apparatus as recited in claim 1 further including a thermal dissipation system to allow thermal energy to propagate away from said portable electrical device, wherein said primary power storage system is positioned adjacent to and spaced-apart from said microelectromechanical power generator, with said controller system being disposed therebetween and said thermoelectric power generator including first and second segments, said microelectromechanical power generator, said controller system and said primary power storage system being disposed between said first and second segments, a first layer of said thermal dissipation system extending between said microelectromechanical power generator and said first segment, and a second layer of said thermal dissipation system extending between said primary power storage system and said second segment, said photovoltaic electrical power generator being positioned adjacent to one of said first and second segments, with said primary power storage system being adjacent to the remaining one of said first and second segments.

6. The apparatus as recited in claim 1 wherein said controller system further includes a processor and a memory for storing non-transitory computer readable code, with said memory being in data communication with said processor, said non-transitory computer readable code including a first set of instructions operated on by said processor to sense a quantity of stored electrical power in said primary power storage system and a second set of instructions to allow one of said photovoltaic electrical power generator, said thermoelectric power generator and said microelectromechanical power generator to transmit electrical energy to said primary power storage system in response to said quantity reaching a pre-determined level.

7. The apparatus as recited in claim 1 wherein said controller system further includes a processor and a memory for storing non-transitory computer readable code, with said memory being in data communication with said processor, said non-transitory computer readable code including a first set of instructions operated on by said processor to sense a quantity of stored electrical power in said primary power storage system and a second set of instructions to measure electrical energy being generated by each said photovoltaic electrical power generator, said thermoelectric power generator and a microelectromechanical power generator and a third set of instructions to transmit electrical energy to said primary power storage system from one of said photovoltaic electrical power generator, said thermoelectric power generator and a microelectromechanical power generator, with the one of one of said photovoltaic electric power generator, said thermoelectric power generator and a microelectromechanical power generator transmitting electrical energy to the primary power storage system producing the greatest amount of electrical energy amongst said photovoltaic electrical power generator, said thermoelectric power generator and said microelectromechanical power generator.

8. The apparatus as recited in claim 1 wherein said power source further includes a secondary power storage system electrically coupled between said primary power storage system and said multi-spectrum power generation system.

9. A system including a mobile electrical device and a power source, said power source comprising:
    a multi-spectrum power generation system in electrical communication with the mobile electrical device, said multi-spectrum power generation system having opposed sides and including a photovoltaic electrical power generator, a bifurcated thermoelectric power generator having first and second segments and a microelectromechanical power generator, with said photovoltaic electrical power generator being disposed on one of said opposed sides and said first segment being disposed upon the remaining of said opposed sides adjacent to said mobile electrical device;

a primary power storage system in electrical communication with mobile electrical device;

a controller system in data communication with the multi-spectrum power generation system to regulate electrical communication between said primary power storage system and said power generation system; and a thermal dissipation system having first and second layers of thermally conductive material, with said second layer being disposed between said bifurcated thermoelectric power generator and said controller system to propagate thermal energy away from said mobile electrical device.

10. The apparatus as recited in claim 9 wherein said first layer extends over a first plane between said first segment and said photovoltaic electrical power generator and in thermal communication with a heat sink, said heat sink extending along a second plane orientated orthogonally to said first plane.

11. The system as recited in claim 9 wherein said primary energy storage system is positioned adjacent to and spaced-apart from said microelectromechanical power generator, with said controller system being disposed therebetween and said controller system and said primary power storage system being disposed between said first and second layers.

12. The system as recited in claim 9 wherein said primary power storage system is positioned adjacent to and spaced-apart from said microelectromechanical power generator, with said controller system being disposed therebetween and said microelectromechanical power generator, said controller system and said primary power storage system being disposed between said first and second segments, said second layer extending between said microelectromechanical power generator and one of the first and section segments and a second layer extending between said primary power storage system and the remaining one of said first and second segments.

13. The system as recited in claim 9 wherein said power source further includes a secondary power storage system electrically coupled between said primary power storage system and said multi-spectrum power generation system.

14. A system including a mobile electrical device and a power source, said power source comprising:

a multi-spectrum power generation system in electrical communication with the mobile electrical device, said multi-spectrum power generation system having opposed sides and including a photovoltaic electrical power generator, a bifurcated thermoelectric power generator having first and second segments and a microelectromechanical power generator, with said photovoltaic electrical power generator being disposed on one of said opposed sides and said first segment being disposed upon the remaining of said opposed sides adjacent to said mobile electrical device;

a primary power storage system in electrical communication with mobile electrical device;

a controller system in data communication with the multi-spectrum power generation system to regulate electrical communication between said primary power storage system and said multi-spectrum power generation system and including a processor and a memory for storing non-transitory computer readable code, with said memory being in data communication with said processor, said non-transitory computer readable code including a first set of instructions operated on by said processor to sense a quantity of stored electrical power in said primary power storage system and a second set of instructions to measure electrical energy being generated by each said photovoltaic electrical power generator, said bifurcated thermoelectric power generator and said microelectromechanical power generator and a third set of instructions to transmit electrical energy to said primary power storage system from one of said photovoltaic electrical power generator, said bifurcated thermoelectric power generator and a microelectromechanical power generator, with the one of one of said photovoltaic electrical power generator, said bifurcated thermoelectric power generator and said microelectromechanical power generator transmitting electrical energy to the primary power storage system producing the greatest amount of electrical energy amongst said photovoltaic electrical power generator, said said bifurcated thermoelectric power generator and said microelectromechanical power generator; and a thermal dissipation system coupled between said bifurcated thermoelectric power generator and said controller system to propagate thermal energy away from said mobile electrical device, said thermal dissipater includes a first layer of thermally conductive material extending over a first plane between said second segment and said primary power storage system and in thermal communication with a heat sink, said heat sink extending along a second plane orientated orthogonally to said first plane.

15. The system as recited in claim 14 wherein said power source further includes a secondary power storage system electrically coupled between said primary power storage system and said multi-spectrum power generation system.

16. The system as recited in claim 14 wherein said non-transitory computer readable code further includes an additional set of instructions to sense a storage level of said secondary power storage system and transmitting energy stored in said secondary power storage system to said primary power storage system upon sensing present conditions.

17. An apparatus including an electrical device and a power source, said power source comprising:

a multi-spectrum power generation system in electrical communication with the mobile electrical device, said multi-spectrum power generation system including a photovoltaic electrical power generator, and a thermoelectric power generator having first and second layers;

a primary power storage system in electrical communication with the electrical device; and a controller system in data communication with the multi-spectrum energy power generator systems to regulate electrical communication between said power primary storage system and said multi-spectrum power generation system, said microelectromechanical generator, said controller system and said primary energy storage system being disposed between said first and second layers.

* * * * *